(12) United States Patent
Zhang

(10) Patent No.: US 7,301,306 B2
(45) Date of Patent: Nov. 27, 2007

(54) CHARGING AND DISCHARGING CONTROL CIRCUIT AND CHARGING TYPE POWER SUPPLY DEVICE

(75) Inventor: Wei Zhang, Chiba (JP)

(73) Assignee: Seiko Instruments Inc. (JP)

( * ) Notice: Subject to any disclaimer, the term of this patent is extended or adjusted under 35 U.S.C. 154(b) by 402 days.

(21) Appl. No.: 10/942,457

(22) Filed: Sep. 16, 2004

(65) Prior Publication Data

US 2005/0068008 A1  Mar. 31, 2005

(30) Foreign Application Priority Data

Sep. 17, 2003  (JP) ............................... 2003-324245

(51) Int. Cl.
*H01M 10/46* (2006.01)
(52) U.S. Cl. ..................................... 320/134
(58) Field of Classification Search ................ 320/116, 320/130, 134, 136
See application file for complete search history.

(56) References Cited

U.S. PATENT DOCUMENTS 5,631,537 A * 5/1997 Armstrong .................. 320/118

* cited by examiner

*Primary Examiner*—Edward H. Tso
(74) *Attorney, Agent, or Firm*—Adams & Wilks

(57) ABSTRACT

A charging and discharging control circuit has over-charge detection circuits that monitor secondary batteries. A delay circuit generates a delay time in response to outputs from the over-charge detection circuits. A charging and discharging switch control circuit controls a charging and discharging switch circuit in response to outputs from the over-charge detection circuits and an output from the delay circuit. Detection circuits detect a voltage higher than an over-charge detection voltage of the secondary batteries. A circuit changes a state of the charging and discharging control circuit between a normal state for controlling charging and discharging of the secondary batteries and a test state for evaluating a characteristic of the charging and discharging control circuit in response to signals from the plurality of detection circuits.

20 Claims, 3 Drawing Sheets

FIG. 3

| VOLTAGE APPLIED TO BATTERY CONNECTION TERMINAL | STATE OF CHARGING AND DISCHARGING CONTROL CIRCUIT | DELAY TIME MODE 1 (FUSE 1 NOT CUT) | DELAY TIME MODE 2 (FUSE 1 CUT) |
|---|---|---|---|
| V2 IS APPLIED AS VOLTAGE HIGHER THAN OVER-CHARGE DETECTION VOLTAGE | NORMAL STATE | OSCILLATOR IS OPERATED AT NORMAL OSCILLATING FREQUENCY<br>OVER-CHARGE DETECTION DELAY TIME<br>$Tc = 2^{m-1} \times Tclk$<br>OVER-DISCHARGE DETECTION DELAY TIME<br>$Td = 2^{n-1} \times Tclk$<br>ANOTHER DELAY TIME<br>$Tx = 2^{k-1} \times Tclk$ | OSCILLATOR IS OPERATED AT NORMAL OSCILLATING FREQUENCY<br>OVER-CHARGE DETECTION DELAY TIME<br>$Tc = 2^{m-1} \times Tclk$<br>OVER-DISCHARGE DETECTION DELAY TIME<br>$Td = 2^{n-1} \times Tclk$<br>ANOTHER DELAY TIME<br>$Tx = 2^{k-1} \times Tclk$ |
| V1 IS APPLIED AS VOLTAGE HIGHER THAN OVER-CHARGE DETECTION VOLTAGE | TEST STATE | OSCILLATOR IS ACCELERATED TO K-TIMES HIGHER OSCILLATING FREQUENCY<br>OVER-CHARGE DETECTION DELAY TIME<br>$Tc = Tclk/K$<br>OVER-DISCHARGE DETECTION DELAY TIME<br>$Td = Tclk/K$<br>ANOTHER DELAY TIME<br>$Tx = 2^{k-1} \times Tclk/K$ | OSCILLATOR IS ACCELERATED TO K-TIMES HIGHER OSCILLATING FREQUENCY<br>OVER-CHARGE DETECTION DELAY TIME<br>$Tc = 2^{m-1} \times Tclk/K$<br>OVER-DISCHARGE DETECTION DELAY TIME<br>$Td = 2^{n-1} \times Tclk/K$<br>ANOTHER DELAY TIME<br>$Tx = 2^{k-1} \times Tclk/K$ |

CHARGING AND DISCHARGING CONTROL CIRCUIT AND CHARGING TYPE POWER SUPPLY DEVICE

BACKGROUND OF THE INVENTION

1. Field of the Invention

The present invention relates to a charging and discharging control circuit and a charging type power supply device, which are used for a secondary battery, and more particularly to a test function for evaluating a characteristic of the charging and discharging control circuit.

2. Description of the Related Art

A lithium ion secondary battery that has significantly contributed to the widespread use of portable devices, such as a mobile telephone and a personal handyphone system (PHS), is characterized by a small size, light weight, and a large capacity. Therefore, the long-time drive of the portable device and a reduction in weight thereof are realized. However, because the charging and discharging of the secondary battery are repeated, the possibility that the secondary battery will more likely be put in an over-charge state or an over-discharge state becomes higher. When the secondary battery is put in the over-charge state, a temperature of the secondary battery increases. Then, a gas is generated by the decomposition of an electrolyte solution, so that an internal pressure of the secondary battery increases or a metal of Li is precipitated. Thus, there is a fear of ignition or burst. In contrast to this, when the secondary battery is put in the overdischarge state, the electrolyte solution is decomposed to deteriorate the characteristic of the secondary battery. In order to prevent the occurrences of such states, a protection circuit is incorporated in a battery pack.

According to a fundamental technique of the protection circuit, a charging and discharging control switch circuit is provided on a charging and discharging path between the secondary battery and the main body of the portable device. When a charging and discharging control circuit detects a state in which the secondary battery is charged with a voltage equal to or higher than a predetermined voltage, a state in which the secondary battery is discharged with a voltage equal to or lower than a predetermined voltage, or a state in which the secondary battery is discharged with an excessive current, the charging and discharging control switch circuit is turned OFF to prevent the over-charge state, the over-discharge state, and an over-current state from occurring.

The lithium ion secondary battery has a high internal impedance. Therefore, a battery voltage appears to change according to charging and discharging currents. While the charging current is flowing, the battery voltage appears to be high. While the discharging current is flowing, the battery voltage appears to be low. When the battery is efficiently used, it is necessary to set an over-charge detection delay time and an over-discharge detection delay time. When false cancellation caused by a noise is prevented, it is necessary to set a cancel delay time. For example, JP 2001-283932 A (pages 1 to 6 and FIG. 1) discloses that the delay times are set by an internal delay circuit to shorten test times for over-charging and over-discharging. The internal delay circuit provides all delay times. Thus, it is unnecessary to provide external capacitors for determining delay times, so that the number of external parts of the protection circuit can be reduced.

However, in a charging and discharging control circuit using the internal delay circuit, the delay times are hard to change from the outside. The evaluation of the characteristic of the charging and discharging control circuit takes enormous amounts of test time because of the influence of the delay times. The over-current detection delay time and the over-discharge detection delay time each are generally about several milliseconds to 100 milliseconds, so that the test time is not significantly influenced by the delay time. Because the over-charge detection delay time is generally set to about several seconds, the test takes a long time. Therefore, it is necessary for the charging and discharging control circuit using the internal delay circuit to set a test mode for shortening the delay times.

JP 2001-283932 A discloses a charging and discharging control circuit and a charging type power supply device, in which a test mode for shortening the delay times in the internal control circuit is set when a voltage equal to or higher than a specified voltage is applied between a charger connection terminal. FIG. 2 shows such a circuit example. When the battery is put in the over-charge state, an output of an over-charge detection comparator 213 becomes a high level and an internal control circuit 220 outputs a control signal to an internal delay circuit 221. The internal delay circuit 221 receives an output voltage (control signal) from the internal control circuit 220 as an input signal and outputs a signal for controlling a switch circuit 202 after the lapse of a specified delay time t1.

When a voltage of an over-current detection terminal becomes equal to or higher than a specified voltage V1, an output of a voltage detection comparator 215 becomes a high level. When the output of the voltage detection comparator 215 is the high level, the internal control circuit 220 enters a state of outputting a control signal for shortening a delay time of the internal delay circuit 221, and holds the state. When the battery is put in the over-charge state, the output of the over-charge detection comparator 213 becomes a high level and the internal control circuit 220 outputs the control signal to the internal delay circuit 221. The internal delay circuit 221 receives the output voltage (control signal) from the internal control circuit 220 as an input signal and outputs the signal for controlling the switch circuit 202 after the lapse of a specified delay time t2. For that reason, once a voltage applied to the over-current detection terminal reaches the voltage V1 equal to or higher than the specified voltage, the short delay time is maintained. After that, an over-charge detection voltage can be measured in a state where the over-charge delay time is short.

When the voltage of the over-current detection terminal becomes equal to or lower than a specified voltage V2, an output of a voltage detection comparator 214 becomes a high level. When the output of the voltage detection comparator 214 is the high level, the internal control circuit 220 cancels the state of outputting the control signal for shortening the delay time of the internal delay circuit 221 to set the normal delay time t1. Therefore, once a voltage applied to the over-current detection terminal becomes the voltage V2 equal to or lower than the specified voltage, the internal control circuit 220 resets the test mode and returns to a normal state.

However, according to the invention in JP 2001-283932 A, it is necessary to detect the voltage of the over-current detection terminal at a plurality of levels. According to the above-mentioned technique, there is a problem in that a circuit structure is complicated and stable operation is hard to ensure.

In addition, when voltages for detecting the over-charge and over-discharge and for canceling are set in a mass production process, it is necessary to measure detection voltages with precision. At this time, a wait time equal to or longer than several seconds is required every time an input voltage is stepped up. If the detection voltages can be detected by 25 steps, a time required for measuring the detection voltages becomes 125 seconds in the case where the wait time is assumed to be 5 seconds. Even if the charging and discharging control circuit has a test mode for shortening the delay time to 1/50, the measurement takes 2.5 seconds per chip. Such measurement takes too long time in terms of mass production and becomes a serious problem in view of a test cost.

That is, in the case of initial measurement on a secondary battery charging and discharging control circuit including a delay circuit, which is performed at the factory, it is necessary to further shorten the detection delay time. In addition, in the cases of secondary measurement and customer's evaluation, both the normal use mode and the test mode for shortening the delay time are required. It is desired to realize such a control function using few external terminals.

SUMMARY OF THE INVENTION

An object of the present invention is to ensure a simple and stable circuit operation by realizing a test function through detection of a voltage higher than an over-charge detection voltage of a secondary battery without providing a separate test terminal, thereby reducing a cost. Another object of the present invention is to reduce a cost by setting a plurality of test time shortening modes using a fuse.

The present invention provides a charging type power supply device, including: a plurality of over-charge detection circuits; a delay circuit; and a charging and discharging switch control circuit, the charging and discharging control circuit including: a detection circuit for detecting a voltage higher than an over-charge detection voltage of a secondary battery; and switching means for switching between a normal state for controlling charging and discharging of the secondary battery and a test state for evaluating a characteristic of the charging and discharging control circuit based on outputs from the plurality of detection circuits.

In the charging type power supply device, the switching means sets the charging and discharging control circuit to the test state when a first detection circuit of the plurality of detection circuits detects the voltage higher than the over-charge detection voltage, and sets the charging and discharging control circuit to the normal state when a second detection circuit of the plurality of detection circuits detects the voltage higher than the over-charge detection voltage.

Further, acceleration means for increasing an oscillating frequency of an oscillator circuit constituting a delay circuit when the charging and discharging control circuit is in the test state is provided. The charging and discharging control circuit further includes a fuse and switching is performed between stages of a counter circuit constituting the delay circuit based on presence or absence of the fuse when the charging and discharging control circuit is in the test state.

As described above, according to the charging and discharging control circuit and the charging type power supply device in the present invention, switching between test functions is realized without adding an external control terminal, and the efficient use of a test time is realized by setting a plurality of delay time modes in a test state.

BRIEF DESCRIPTION OF THE DRAWINGS

In the accompanying drawings:

FIG. 3 is a table showing a relationship between a voltage applied between battery connection terminals and a state and function of the charging and discharging control circuit according to the embodiment of the present invention.

DETAILED DESCRIPTION OF THE PREFERRED EMBODIMENT

Figure 1:
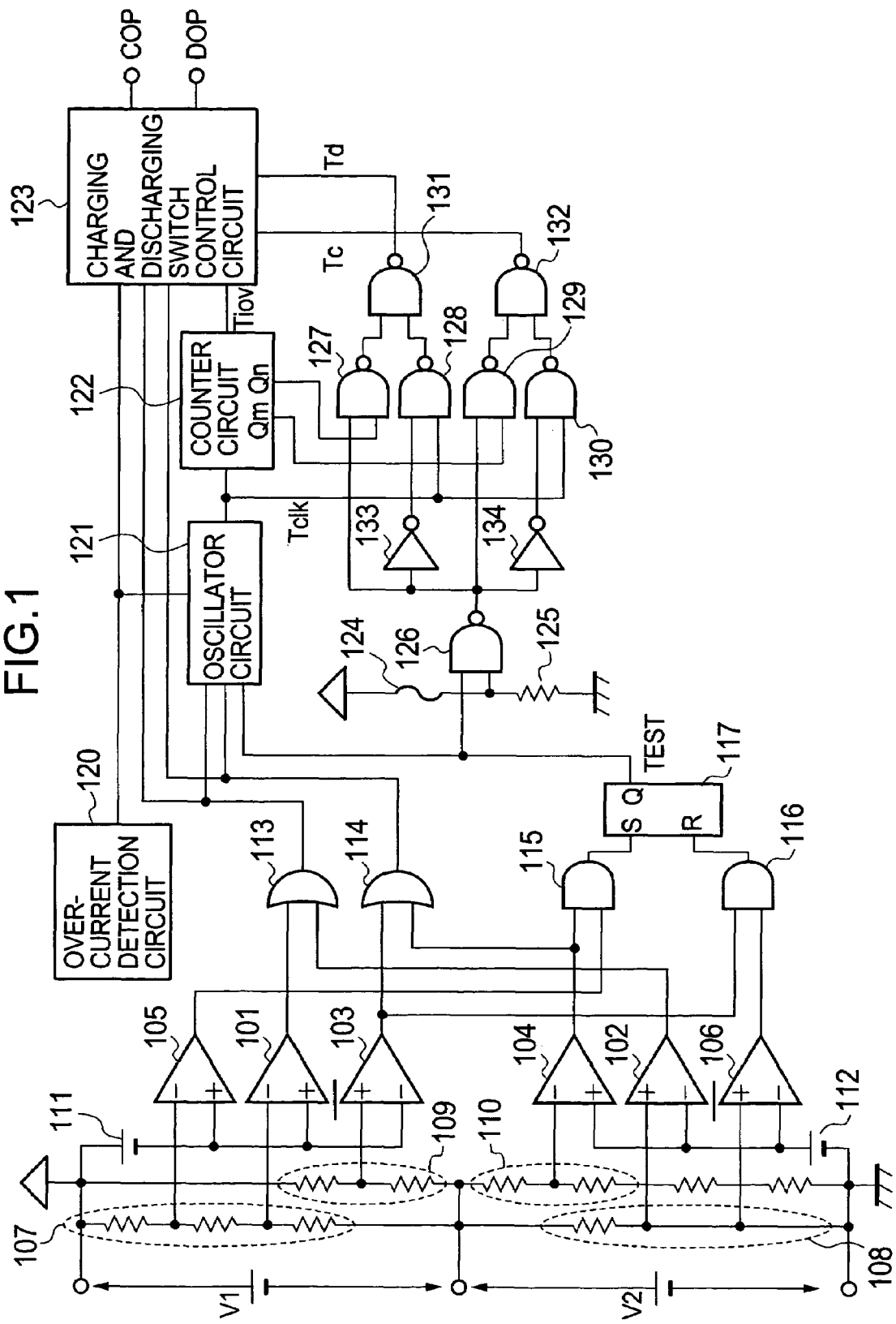
FIG. 1 is a circuit diagram showing a charging and discharging control circuit according to an embodiment of the present invention.
Figure 2:
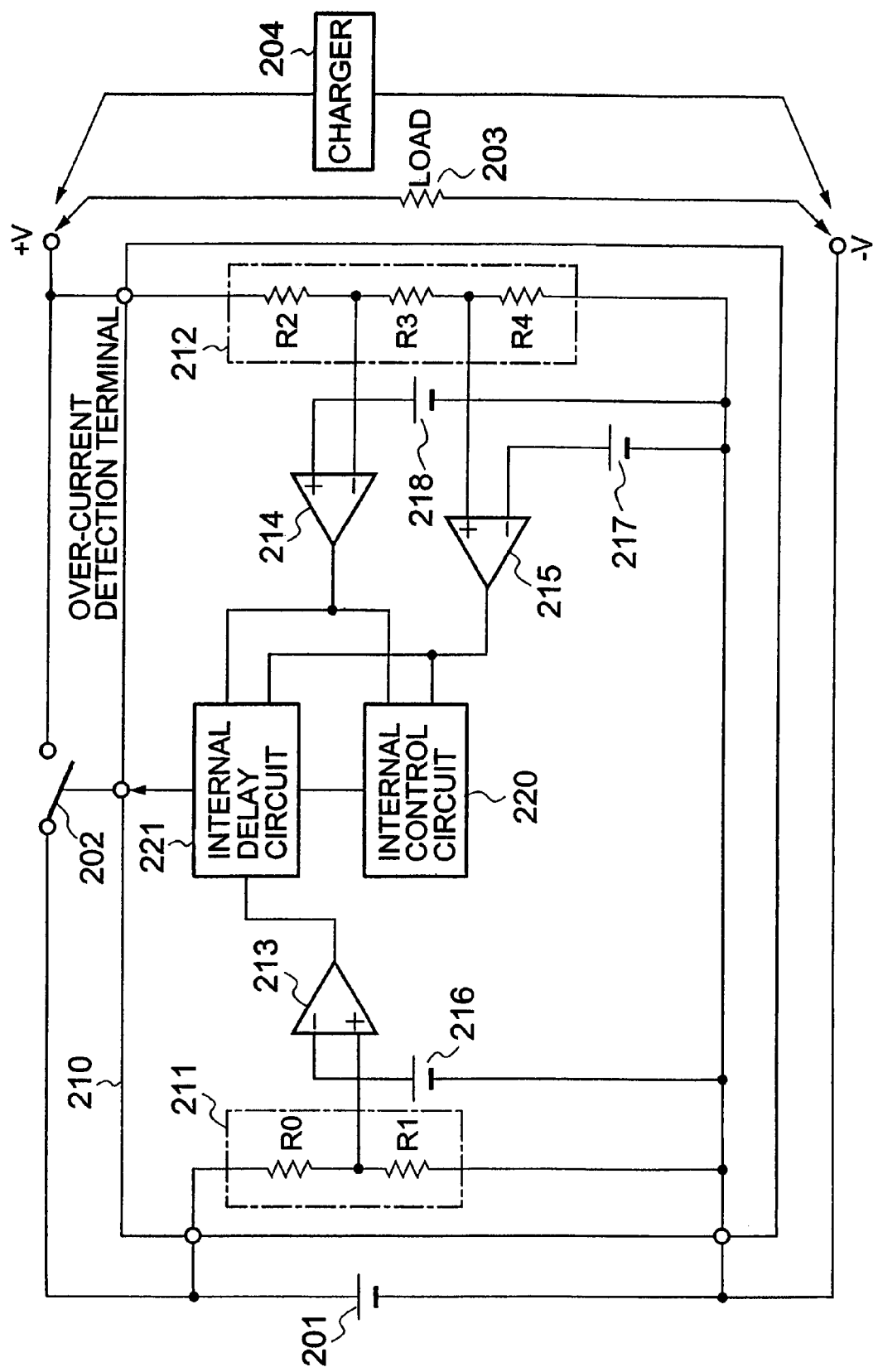
FIG. 2 is a circuit diagram showing an example of a conventional charging and discharging control circuit.

Hereinafter, an embodiment of the present invention will be described in detail with reference to the accompanying drawings. FIG. 1 is a circuit diagram for explaining a charging and discharging control circuit according to the embodiment of the present invention. In FIG. 1, the charging and discharging control circuit includes an over-charge detection comparator 101 for a battery cell-1, an over-charge detection comparator 102 for a battery cell-2, an over-discharge detection comparator 103 for the battery cell-1, an over-discharge detection comparator 104 for the battery cell-2, bleeder resistors 107 and 108 for over-charge detection, bleeder resistors 109 and 110 for over-discharge detection, a circuit 111 for generating a reference voltage for the battery cell-1, a circuit 112 for generating a reference voltage for the battery cell-2, an OR circuit 113 for over-charge detection, an OR circuit 114 for over-discharge detection, and an over-current detection circuit 120. The charging and discharging control circuit further includes an oscillator circuit 121 having a clock cycle Tclk, a counter circuit 122, and a charging and discharging switch control circuit 123. The charging and discharging switch control circuit 123 causes a charging control switch and a discharging control switch to turn ON/OFF through a charging control output terminal COP and a discharging control output terminal DOP based on information including battery states and charging and discharging currents. The charging control switch and the discharging control switch are located between the secondary batteries and external power supply terminals. The battery states and charging and discharging currents are obtained by the over-charge detection comparator 101, the over-charge detection comparator 102, the over-discharge detection comparator 103, the over-discharge detection comparator 104, and the over-current detection circuit 120. Therefore, a function for protecting the batteries is realized.

The charging and discharging control circuit further includes a detection comparator 105 for detecting a voltage higher than an over-charge detection voltage of the battery cell-1 and a detection comparator 106 for detecting a voltage higher than an over-charge detection voltage of the battery cell-2 as shown in FIG. 1. Each of the voltages detected by the detection comparators 105 and 106 is set to a value higher than the over-charge detection voltage. In other words, each of the voltages is set in a high battery voltage range, which is impossible in normal use.

As shown in FIG. 1, when the voltage higher than the over-charge detection voltage is applied between battery connection terminals of the battery cell-1 and simultaneously a voltage equal to or lower than a specified voltage is applied between battery connection terminals of the battery cell-2, the detection comparator 105 detects the voltage higher than the over-charge detection voltage and simultaneously the over-discharge detection comparator 104 detects an over-discharge state. At this time, the detection comparator 106 and the over-discharge detection comparator 103 detect none. Then, a latch circuit 117 is set through an AND circuit 115, so that a TEST signal becomes "H".

Therefore, the charging and discharging control circuit enters a test state. The test state is kept until the TEST signal becomes "L". In contrast to this, when the voltage higher than the over-charge detection voltage is applied between the battery connection terminals of the battery cell-2 and simultaneously the voltage equal to or lower than the specified voltage is applied between the battery connection terminals of the battery cell-1, the detection comparator 106 detects the voltage higher than the over-charge detection voltage and simultaneously the over-discharge detection comparator 103 detects the over-discharge state. At this time, the detection comparator 105 and the over-discharge detection comparator 104 detect none. Then, the latch circuit 117 is reset through an AND circuit 116, so that the TEST signal becomes "L". Therefore, the test state of the charging and discharging control circuit is cancelled to return to a normal state. The normal state is kept until the TEST signal becomes "H".

In the case of the normal state, the charging and discharging switch control circuit 123 causes the charging control switch and the discharging control switch to turn ON/OFF through the charging control output terminal COP and the discharging control output terminal DOP based on the information including the battery states and the charging and discharging currents. The battery states and charging and discharging currents are obtained by the over-charge detection comparator 101, the over-charge detection comparator 102, the over-discharge detection comparator 103, the over-discharge detection comparator 104, and the over-current detection circuit 120. Because the TEST signal is "L", the oscillator circuit is oscillated at a normal oscillating frequency. The clock cycle is Tclk. An output of a NAND circuit 126 becomes "H", so that an over-charge detection delay time and an over-discharge detection delay time each become a delay time obtained from the counter circuit. For example, when the detection comparator 101 detects the over-charge state of the battery cell-1, the oscillator circuit is oscillated. The clock cycle Tclk is sent to the counter circuit. The over-charge detection delay time is obtained from an m-stage Qm of the counter circuit, so that the over-charge detection delay time is represented by the following expression:

$$Tc = 2^{m-1} * Tclk \quad \text{(Expression 1)}$$

When the over-charge detection delay time elapses, the charging and discharging switch control circuit 123 causes the charging control switch to turn OFF through the charging control output terminal COP. The over-discharge detection delay time is obtained from an n-stage Qn of the counter circuit, so that the over-discharge detection delay time is represented by the following expression:

$$Td = 2^{n-1} * Tclk \quad \text{(Expression 2)}$$

When the detection comparator 103 detects the over-discharge state of the battery cell-1 and the over-discharge detection delay time elapses, the charging and discharging switch control circuit 123 causes the discharging control switch to turn OFF through the charging control output terminal DOP. For example, assume that the clock cycle Tclk of the oscillator circuit is set to 300 μsec., the over-charge detection delay time is obtained from a fifteenth stage Q15 of the counter circuit, and the over-discharge detection delay time is obtained from a tenth stage Q10 of the counter circuit. Therefore, according to Expressions 1 and 2, the over-charge detection delay time Tc becomes 4.9 seconds and the over-discharge detection delay time Td becomes 154 milliseconds.

On the other hand, in the case of the test state, the charging and discharging switch control circuit 123 causes the charging control switch and the discharging control switch to turn ON/OFF through the charging control output terminal COP and the discharging control output terminal DOP based on the information including the battery states and the charging and discharging currents. The battery states and charging and discharging currents are obtained by the over-charge detection comparator 101, the over-charge detection comparator 102, the over-discharge detection comparator 103, the over-discharge detection comparator 104, and the over-current detection circuit 120. Because the TEST signal is "H", the oscillator circuit is oscillated at an accelerated oscillating frequency. When the oscillator circuit is accelerated at a K-times higher oscillating frequency, the clock cycle becomes Tclk/K. The output of the NAND circuit 126 is determined according to the presence or absence of a fuse 124. Therefore, the over-charge detection delay time and the over-discharge detection delay time can be obtained from the direct output of the oscillator circuit 121 or the output of the counter circuit, which is selected by switching.

In initial measurement for trimming to setting voltages for detecting the over-charging and over-discharging and canceling, which is performed at the factory, the fuse 124 is not cut, so that the output of the NAND circuit 126 becomes "L". In this case, the over-charge detection delay time and the over-discharge detection delay time are directly obtained from the output of the oscillator circuit 121 by a logical circuit which is composed of inverters 133 and 134 and NAND circuits 127, 128, 129, 130, 131, and 132. Therefore, the over-charge detection delay time is represented by the following expression:

$$Tc = Tclk/K \quad \text{(Expression 3)}$$

and the over-discharge detection delay time is represented by the following expression:

$$Td = Tclk/K \quad \text{(Expression 4)}$$

Because an over current delay time and all cancel delay times are obtained from the counter circuit, the cancel delay times are determined according to only an acceleration factor of the oscillator circuit. This is referred to as a delay time mode 1. For example, when the clock cycle Tclk of the oscillator circuit is set to 300 μsec. and an acceleration factor K of the oscillator circuit is set to 50, the over-charge detection delay time Tc and the over-discharge detection delay time Td each become 6 μsec. according to Expressions 3 and 4. In contrast to the over-charge detection delay time of several seconds in the above-mentioned normal state, the over-charge detection delay time is only several microseconds. Thus, when the over-charge detection voltage value is measured with precision, it is possible to significantly shorten the test time.

In the cases of a secondary test and customer's evaluation, the fuse 124 is cut, so that the output of the NAND circuit 126 becomes "H" by a pull-down resistor 125. In this case, the over-charge detection delay time and the over-discharge detection delay time are obtained from the outputs of the counter circuit as in the normal state by a logical circuit which is composed of the inverters 133 and 134 and the NAND circuits 127, 128, 129, 130, 131, and 132. At this time, the TEST signal is "H", so that the oscillator circuit is accelerated at a K-times higher oscillating frequency. Therefore, the over-charge detection delay time is represented by the following expression:

$$Tc = 2^{m-1} * Tclk/K \quad \text{(Expression 5)}$$

and the over-discharge detection delay time is represented by the following expression:

$$Td = 2^{n-1} * Tclk/K \quad \text{(Expression 6)}$$

The over current delay time and all the cancel delay times are shortened according to the acceleration factor of the oscillator circuit. This is referred to as a delay time mode 2. For example, assume that the clock cycle Tclk of the oscillator circuit is set to 300 μsec. and the acceleration factor K of the oscillator circuit is set to 50. In this case, according to Expressions 5 and 6, the over-charge detection delay time Tc becomes 98 milliseconds and the over-discharge detection delay time Td becomes 3 milliseconds. Thus, when the over-charge detection voltage value and the over-discharge detection voltage value are measured, it is possible to not only shorten the delay times but also evaluate each of the delay times.

As described above, in the charging and discharging control circuit and charging type power supply device of the present invention, switching between the states is performed on a case-by-case basis as follows.

In the initial measurement for trimming to setting voltages for detecting the over-charging and over-discharging and canceling, which is performed at the factory, the fuse is not cut and a voltage higher than the over-charge detection voltage is inputted to a battery connection terminal of the charging and discharging control circuit, which is connected with a battery. Therefore, the charging and discharging control circuit can be set to the test state and the test state is kept by a holding circuit. In the test state, the oscillating frequency of the oscillator circuit composing the delay circuit becomes higher and an over-charge detection signal and an over-discharge detection signal do not pass through the counter circuit composing the delay circuit, so that a delay time of the over-charge detection signal and a delay time of the over-discharge detection signal each become the oscillating cycle of the oscillator circuit. Thus, even when the over-charge detection voltage and the over-discharge detection voltage are measured with precision, a wait time is significantly shortened, so that the test time can be significantly shortened. In the delay time mode 1, each of delay times of other signals (over-current detection delay time and all cancel delay times) becomes a time for which a signal shortened by the accelerated oscillating frequency of the oscillator circuit passes through the counter circuit composing the delay circuit.

In the cases of the secondary test and customer's evaluation, the fuse is cut and a voltage higher than the over-charge detection voltage is inputted to a battery connection terminal of the charging and discharging control circuit. Therefore, the charging and discharging control circuit can be set to the test state, and the test state is kept by a holding circuit. In the test state, the oscillating frequency of the oscillator circuit composing the delay circuit becomes higher. However, each of all signals including the over-charge detection signal and the over-discharge detection signal corresponds to a delay time for which each of the signals passes through the counter circuit composing the delay circuit. In the delay time mode 2, the test times for measuring the over-charge detection voltage value, the over-discharge detection voltage value, and the over-current detection voltage value can be shortened and the evaluation between the respective delay times can be performed.

Then, when the voltage higher than the over-charge detection voltage is inputted to another battery connection terminal of the charging and discharging control circuit, the test state kept by the holding circuit is canceled. Therefore, the charging and discharging control circuit returns to the normal state. In this state, all the signals including the over-charge detection signal and the over-discharge detection signal with delay times are sent to the charging and discharging switch control circuit through the counter circuit composing the delay circuit regardless of the presence or absence of the fuse. Thus, each of the delay times of all the signals including the over-charge detection signal and over-discharge detection signal becomes the delay time in the normal state.

FIG. 3 is a table showing a relationship between the voltage applied between the battery connection terminals and the state and function of the charging and discharging control circuit.

What is claimed is:

1. A charging and discharging control circuit comprising:
   a plurality of over-charge detection circuits that monitor a plurality of secondary batteries;
   a delay circuit that generates a delay time in response to outputs from the over-charge detection circuits;
   a charging and discharging switch control circuit that controls a charging and discharging switch circuit in response to outputs from the over-charge detection circuits and an output from the delay circuit;
   a plurality of detection circuits that detect a voltage higher than an over-charge detection voltage of the secondary batteries; and
   a circuit that chances a state of the charging and discharging control circuit between a normal state for controlling charging and discharging of the secondary batteries and a test state for evaluating a characteristic of the charging and discharging control circuit in response to signals from the plurality of detection circuits.

2. A charging and discharging control circuit according to claim 1; wherein the circuit changes the state of the charging and discharging control circuit to the test state when a first detection circuit of the plurality of detection circuits detects a voltage higher than the over-charge detection voltage.

3. A charging and discharging control circuit according to claim 2; wherein the circuit changes the state of the charging and discharging control circuit to the normal state when a second detection circuit of the plurality of detection circuits detects a voltage higher than the over-charge detection voltage.

4. A charging and discharging control circuit according to claim 1; further comprising a holding circuit that holds a state of the charging and discharging control circuit.

5. A charging and discharging control circuit according to claim 1; wherein the delay circuit comprises an oscillator circuit; and wherein the charging and discharging control circuit further comprises acceleration means for increasing an oscillating frequency of the oscillator circuit when the charging and discharging control circuit is in the test state.

6. A charging and discharging control circuit according to claim 1; wherein the delay circuit comprises a counter circuit; and wherein the charging and discharging control circuit further comprises a fuse and delay time mode switching means for switching between stages of the counter circuit based on presence or absence of the fuse when the charging and discharging control circuit is in the test state.

7. A charging type power supply device, comprising:
a switch circuit and a secondary battery connected in series with an external power supply terminal; and
a charging and discharging control circuit according to claim 1 connected in parallel with the secondary battery to control the switch circuit.

8. A charging and discharging control circuit comprising:
a plurality of over-charge detection circuits that monitor a plurality of secondary batteries;
a counter circuit that generates a delay time in response to outputs from the over-charge detection circuits;
a plurality of detection circuits that detect a voltage higher than an over-charge detection voltage of the secondary batteries;
a circuit that changes a state of the charging and discharging control circuit between a normal state for controlling charging and discharging of the secondary batteries and a test state for evaluating a characteristic of the charging and discharging control circuit in response to signals from the plurality of detection circuits;
a fuse; and
a delay time mode switching circuit that switches between stages of the counter circuit based on whether the fuse is cut or not when the charging and discharging control circuit is in the test state.

9. A charging and discharging control circuit according to claim 8; wherein the circuit changes the state of the charging and discharging control circuit to the test state when a first detection circuit of the plurality of detection circuits detects a voltage higher than the over-charge detection voltage.

10. A charging and discharging control circuit according to claim 9; wherein the circuit changes the state of the charging and discharging control circuit to the normal state when a second detection circuit of the plurality of detection circuits detects a voltage higher than the over-charge detection voltage.

11. A charging and discharging control circuit according to claim 8; further comprising a holding circuit that holds the test state of the charging and discharging control circuit.

12. A charging type power supply device comprising:
a switch circuit and a secondary battery connected in series with an external power supply terminal; and
a charging and discharging control circuit according to claim 8 connected in parallel with the secondary battery to control the switch circuit.

13. A charging and discharging control circuit comprising:
over-charge detection circuit means for monitoring secondary batteries;
delay circuit means for generating a delay time in response to outputs from the over-charge detection circuit means;
charging and discharging switch control circuit means for controlling a charging and discharging switch circuit in response to outputs from the over-charge detection circuit means and an output from the delay circuit means;
detection circuit means for detecting a voltage higher than an over-charge detection voltage of the secondary batteries; and
circuit means for changing a state of the charging and discharging control circuit between a normal state to control charging and discharging of the secondary batteries and a test state to evaluate a characteristic of the charging and discharging control circuit in response to signals from the detection circuit means.

14. A charging and discharging control circuit according to claim 13; wherein the circuit means includes means for changing the state of the charging and discharging control circuit to the test state when the detection circuit means detects a voltage higher than the over-charge detection voltage.

15. A charging and discharging control circuit according to claim 14; wherein the circuit means includes means for changing the state of the charging and discharging control circuit to the normal state when the detection circuit means detects a voltage higher than the over-charge detection voltage.

16. A charging and discharging control circuit according to claim 13; further comprising holding circuit means for holding a state of the charging and discharging control circuit.

17. A charging and discharging control circuit according to claim 13; wherein the delay circuit means comprises an oscillator circuit; and wherein the charging and discharging control circuit further comprises acceleration means for increasing an oscillating frequency of the oscillator circuit when the charging and discharging control circuit is in the test state.

18. A charging and discharging control circuit according to claim 13; wherein the delay circuit means comprises a counter circuit; and wherein the charging and discharging control circuit further comprises a fuse and delay time mode switching means for switching between stages of the counter circuit based on whether the fuse is cut or not when the charging and discharging control circuit is in the test state.

19. A charging type power supply device, comprising:
a switch circuit and a secondary battery connected in series with an external power supply terminal; and
a charging and discharging control circuit according to claim 13 connected in parallel with the secondary battery to control the switch circuit.

20. A charging type power supply device according to claim 19; wherein the delay circuit means of the charging and discharging control circuit comprises a counter circuit; and wherein the charging and discharging control circuit further comprises a fuse and delay time mode switching means for switching between stages of the counter circuit based on presence or absence of the fuse when the charging and discharging control circuit is in the test state.

* * * * *